(12) United States Patent
Spillman

(10) Patent No.: US 12,544,683 B2
(45) Date of Patent: Feb. 10, 2026

(54) DRAG RACING STABILITY MANAGEMENT FOR A MODEL VEHICLE

(71) Applicant: TRAXXAS, L.P., Mckinney, TX (US)

(72) Inventor: Daryl Gene Spillman, Plano, TX (US)

(73) Assignee: TRAXXAS, L.P., McKinney, TX (US)

( * ) Notice: Subject to any disclaimer, the term of this patent is extended or adjusted under 35 U.S.C. 154(b) by 0 days.

(21) Appl. No.: 17/840,118

(22) Filed: Jun. 14, 2022

(65) Prior Publication Data

US 2022/0395761 A1    Dec. 15, 2022

Related U.S. Application Data

(60) Provisional application No. 63/185,928, filed on Jun. 15, 2021.

(51) Int. Cl.
| | |
|---|---|
| A63H 30/04 | (2006.01) |
| A63H 17/28 | (2006.01) |
| A63H 17/32 | (2006.01) |
| A63H 17/395 | (2006.01) |
| G05D 1/00 | (2006.01) |

(52) U.S. Cl.
CPC .............. *A63H 30/04* (2013.01); *A63H 17/28* (2013.01); *A63H 17/32* (2013.01); *A63H 17/395* (2013.01); *G05D 1/0016* (2013.01); *G05D 1/0022* (2013.01)

(58) Field of Classification Search
CPC ................................................... A63H 17/395
See application file for complete search history.

(56) References Cited

U.S. PATENT DOCUMENTS

| | | | |
|---|---|---|---|
| 4,929,949 A | 5/1990 | Yamamoto et al. | |
| 5,642,281 A | 6/1997 | Ishida et al. | |
| 5,762,554 A | 6/1998 | Siu | |
| 5,925,992 A * | 7/1999 | Orton | A63H 30/04 |
| | | | 388/909 |

(Continued)

FOREIGN PATENT DOCUMENTS

| | | |
|---|---|---|
| AU | 2014216022 A1 | 9/2014 |
| EP | 2296121 A2 | 3/2011 |

(Continued)

OTHER PUBLICATIONS

Translatioon JP2020062298A (Year: 2020).*

(Continued)

*Primary Examiner* — Eugene L Kim
*Assistant Examiner* — Alyssa M Hylinski
(74) *Attorney, Agent, or Firm* — Daryl R. Wright; Greg Carr

(57) ABSTRACT

A radio controlled model vehicle system, receiver, and method is provided. The model vehicle system, receiver, and method include a stability management system. The stability management system further includes a stability operating mode and a stability status indicator that indicates the stability operating mode. The stability operating mode is altered via a stability mode input device and indicated by a stability status indicator. Stability operating modes may include stability management on, stability management off, and stability management on braking, among others. The stability management system may be set on the model vehicle, the controller, or virtually using a portable, multi-function, electronic device.

20 Claims, 2 Drawing Sheets

(56) References Cited

U.S. PATENT DOCUMENTS

| | | | |
|---|---|---|---|
| 6,088,633 | A | 7/2000 | Yamamoto |
| 6,241,574 | B1 | 6/2001 | Helbing |
| 6,821,184 | B1 | 11/2004 | Yeung |
| 7,330,776 | B1 * | 2/2008 | Norman .............. G05D 1/0022 |
| | | | 700/262 |
| 7,610,131 | B2 | 10/2009 | Kojima |
| 8,154,227 | B1 | 4/2012 | Young et al. |
| 8,160,816 | B2 | 4/2012 | Kanai et al. |
| 8,818,571 | B1 * | 8/2014 | Iida ...................... A63H 17/36 |
| | | | 701/2 |
| 9,043,029 | B2 | 5/2015 | Seo |
| 9,320,977 | B2 | 4/2016 | Beard et al. |
| 9,975,056 | B2 * | 5/2018 | Kawamura .......... G05D 1/0011 |
| 10,073,448 | B2 * | 9/2018 | Kawamura .......... G05D 1/0016 |
| 2003/0043053 | A1 | 3/2003 | Schuckel |
| 2004/0016294 | A1 | 1/2004 | Sugitani et al. |
| 2005/0003735 | A1 | 1/2005 | Carter et al. |
| 2005/0222729 | A1 | 10/2005 | Sakata |
| 2005/0267661 | A1 | 12/2005 | Iwazaki et al. |
| 2006/0052917 | A1 | 3/2006 | Schwarzhaupt et al. |
| 2006/0071551 | A1 | 4/2006 | Taniguchi et al. |
| 2006/0085111 | A1 | 4/2006 | Kojima |
| 2006/0211328 | A1 | 9/2006 | del Castillo |
| 2007/0035412 | A1 | 2/2007 | Dvorak et al. |
| 2008/0026671 | A1 | 1/2008 | Smith et al. |
| 2008/0167770 | A1 | 7/2008 | Macdonald et al. |
| 2008/0251312 | A1 | 10/2008 | Goto et al. |
| 2009/0076664 | A1 | 3/2009 | McCabe et al. |
| 2009/0099735 | A1 | 4/2009 | McCoy et al. |
| 2009/0222168 | A1 | 9/2009 | Egenfeldt |
| 2011/0054717 | A1 | 3/2011 | Yamauchi et al. |
| 2011/0231050 | A1 | 9/2011 | Goulding |
| 2012/0041658 | A1 | 2/2012 | Turner |
| 2012/0046856 | A1 | 2/2012 | Doi |
| 2012/0088436 | A1 | 4/2012 | Grossman |
| 2012/0130593 | A1 | 5/2012 | Davis et al. |
| 2012/0179322 | A1 | 7/2012 | Hennessy et al. |
| 2012/0259479 | A1 | 10/2012 | Yoneta et al. |
| 2013/0122779 | A1 | 5/2013 | Doherty |
| 2013/0138266 | A1 | 5/2013 | Koike et al. |
| 2013/0172060 | A1 | 7/2013 | Keating et al. |
| 2013/0207828 | A1 | 8/2013 | Tanaka |
| 2013/0226408 | A1 | 8/2013 | Fung et al. |
| 2013/0226409 | A1 | 8/2013 | Akiyama et al. |
| 2013/0231814 | A1 | 9/2013 | Sarokhan et al. |
| 2014/0012469 | A1 | 1/2014 | Kunihiro et al. |
| 2014/0143839 | A1 | 5/2014 | Ricci |
| 2014/0312824 | A1 | 10/2014 | Beard |
| 2014/0323013 | A1 | 10/2014 | Gonzalez-Heydrich et al. |
| 2015/0015376 | A1 * | 1/2015 | Jenkins ................ G08C 17/02 |
| | | | 340/12.5 |
| 2015/0039350 | A1 | 2/2015 | Martin et al. |
| 2015/0057841 | A1 | 2/2015 | Hsu et al. |
| 2015/0094880 | A1 * | 4/2015 | Beard ................... A63H 17/36 |
| | | | 701/2 |
| 2015/0103019 | A1 | 4/2015 | Young |
| 2015/0309508 | A1 * | 10/2015 | Cevik ................... A63H 30/04 |
| | | | 701/2 |
| 2016/0129355 | A1 * | 5/2016 | Erhart .................. A63H 29/20 |
| | | | 446/454 |
| 2016/0306353 | A1 | 10/2016 | Kawamura et al. |

FOREIGN PATENT DOCUMENTS

| | | | | | |
|---|---|---|---|---|---|
| GB | | 2472786 | A | | 2/2011 |
| JP | | 11078826 | A | | 3/1999 |
| JP | | 2006020652 | A | | 1/2006 |
| JP | | 2009125212 | A | | 6/2009 |
| JP | | 2020062298 | A | * | 4/2020 |
| KR | | 101128670 | B1 | * | 3/2012 ............ B60L 15/08 |
| WO | | 90/14980 | A1 | | 12/1990 |
| WO | WO-2004052484 | A2 | * | 6/2004 ............ A63H 30/04 |
| WO | WO-2019106339 | A1 | * | 6/2019 ............ A63H 30/04 |

OTHER PUBLICATIONS

Translation KR101128670B1 (Year: 2012).*
International Search Report and Written Opinion by the ISA/EP, mailed Jul. 12, 2016, re PCT International Application No. PCT/US2016/028180.
International Search Report and Written Opinion by the ISA/EP, mailed Sep. 5, 2016, re PCT International Application No. PCT/US2016/028175.
Ackermann, Jurgen et al., "Automatic car steering control bridges over the driver reaction time," Kybernetika, vol. 33, No. 1, 1997, pp. 61-74.
Dunsmoor, Adam et al., "Senior design project—Gyroscopic vehicle stabilization," Northern Illinios University, ELE 492, Apr. 29, 2013, Google date: Aug. 13, 2013, 17 pages, on the Internet at: https://reipooom.files.wordpress.com/2013/08/project-report-3.pdf.
Hobby Media blog entry, "HPI Baja 5B D-Box 2 RTR: 2wd buggy in scale 1/5," Mar. 19, 2015, 10 pages, translated from Italian by Google, on the Internet at: http://www.hobbymedia.it/54960/hpi-baja-5b-d-box-2-rtr-buggy-2wd-in-scala-15.
Li, Qiang et al., "Yaw stability control using the fuzzy PID controller for active front steering," High Technology Letters, vol. 16, No. 1, Mar. 2010, pp. 94-98.
Song, Jeonghoon, "Design and comparison of AFS controllers with PID, fuzzy-logic, and sliding-mode controllers," Advances in Mechanical Engineering, vol. 2013, Article ID 401548, 2013, 13 pages.
Wang, Long et al., "Robustly stabilizing PID controllers for car steering systems," Proceedings of the American Control Conference, Philadelphia, Pennsylvania, Jun. 1998, pp. 41ff.
Wu, Jian et al., "Generalized internal model robust control for active front steering intervention," Chinese Journal of Mechanical Engineering, vol. 28, No. 2, Mar. 2015 (First online: Jan. 30, 2015), 9 pages.
Astrom, Karl Johan et al., "Feedback Systems: An Introduction for Scientists and Engineers," Version v2.10b (Feb. 22, 2009), Copyright 2009 Princeton University Press, Princeton and Oxford, Chapter 10, pp. 293-314.
Kahveci, Nazli E., "Adaptive Steering Control for Uncertain Vehicle Dynamics with Crosswind Effects and Steering Angle Constraints," Proceedings of the 2008 IEEE International Conference on Vehicular Electronics and Safety, Columbus, OH, USA, Sep. 22-24, 2008, pp. 162-167.
Spektrum DX3R Pro User Guide, Aug. 2010.

* cited by examiner

DRAG RACING STABILITY MANAGEMENT FOR A MODEL VEHICLE

This application claims the benefit of a related U.S. Provisional Application Ser. No. 63/185,928 filed 15 Jun. 2021, entitled "DRAG RACING STABILITY FOR A MODEL VEHICLE," to Daryl Gene Spillman, the disclosure of which is incorporated by reference herein in its entirety for all purposes.

BACKGROUND

The following descriptions and examples are not admitted to be prior art by virtue of their inclusion in this section.

Radio-Controlled or RC model vehicles are a popular hobby for a growing portion of the population. As the hobby grows and matures, various niche or class segments are generated and RC model vehicles are developed specifically for those segments. The segments may include for example, on-road and off-road competition or performance model vehicles, crawler or trial model vehicles, scale model vehicles, and drag racing model vehicles, among others. Separate rules and governing bodies may manage or officiate contests or competitions between the particular classes of vehicles to ensure a level competitive field. One example of a niche segment includes drag racing RC model vehicles competing against one another for the best time on a short, straight raceway. While a majority of the general description may be focused on wheeled RC vehicles, this is only for the purposes of simplifying the description by using a single common reference. Embodiments of the current disclosure may additionally be applied to other types of air, water, and terrestrial based RC model vehicles.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with one embodiment, a radio controlled model vehicle is provided that includes a receiver. The receiver further includes a stability management system comprising a stability operating mode and a stability status indicator that shows the stability operating mode. Wherein the stability operating mode is altered by a stability mode input device and the stability operating mode is either the absence or application of stability management while braking. Wherein the stability management system functions only while the receiver receives a braking command.

In accordance with another embodiment, a radio controlled model vehicle receiver is provided that includes a stability management system comprising a stability operating mode and a stability status indicator that indicates the stability operating mode. A stability input device alters the stability operating mode and the stability operating mode is either an absence or application of stability management while braking. Wherein the stability management system functions only while the receiver receives a braking command.

In accordance with still another embodiment a method for configuring a stability management system of a radio controlled model vehicle for drag racing is provided. The method includes powering on the radio controlled model vehicle and a controller and selecting a stability management on braking for a stability operating mode using a stability input device. In addition, the method includes verifying the stability operating mode using a stability status indicator. Wherein the stability management system functions only while a receiver receives a braking command from the controller.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Figure 1:
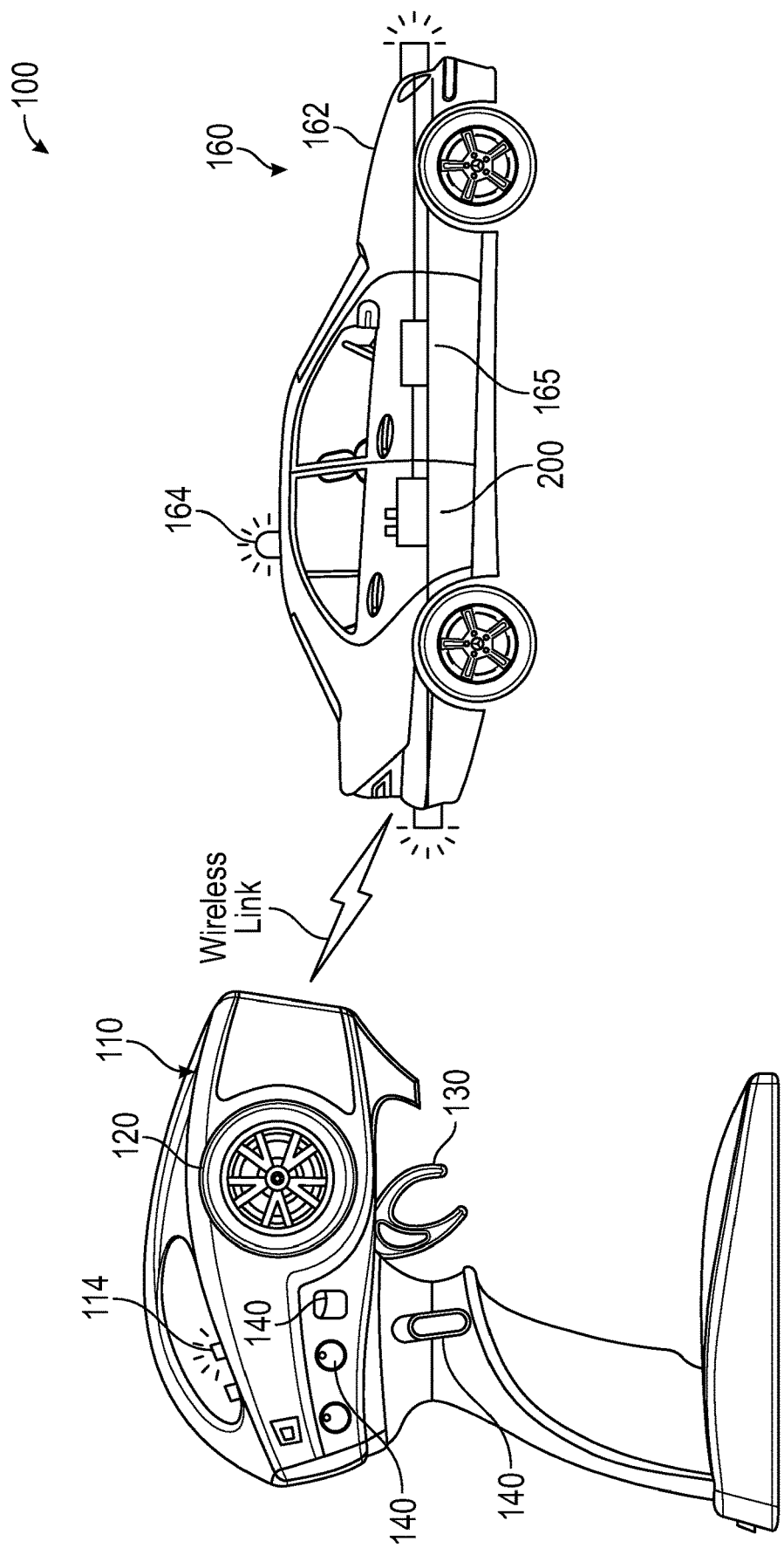
FIG. 1 is a schematic diagram showing a controller and an RC model vehicle and various individual components, in accordance to an embodiment of the current disclosure.

In the following specification, numerous specific details are set forth to provide a thorough understanding of embodiments of the present disclosure. However, those skilled in the art will appreciate that the embodiments may be practiced without such specific details. In other instances, well-known elements have been illustrated in schematic or block diagram form in order not to obscure embodiments of the present disclosure in unnecessary detail.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

RC Model Vehicle Systems

Radio Controlled (RC) model vehicles such as drag racing model vehicles for example, usually comprise a scale version of a model vehicle body coupled to a appropriately sized model vehicle chassis. The model vehicle chassis contains the electronics, batteries, and servos required for operating an RC model vehicle. In some embodiments, the model vehicle body is removed in order to access the electronics, batteries and servos and to power the RC model vehicle on and off.

The electronics may include components such as telemetry sensors, a receiver, an Electronic Speed Control (ESC), and/or a steering stability management system such as an Electronic Steering Stabilization (ESS) system discussed in co-owned U.S. Pat. No. 9,975,056 to Kawamura, Thomas Michael et. al. issued May 22, 2018, and co-owned U.S. Pat. No. 10,073,448 to Kawamura, Thomas Michael et. al. issued Sep. 11, 2018, both of which are hereby incorporated by reference in their entirety for all purposes. The ESC may provide and manage the power delivered to the motors for propulsion. A Battery Eliminator Circuit (BEC) within the ESC may provide a converted power level to the radio receiver, servos, and other electronics at a lower voltage and current level than typically provided to the electronic motor. The Traxxas Stability Management (TSM®) system sold by Traxxas, L.P. and incorporated into various Traxxas RC model vehicle receivers is an illustrative example of an ESS systems.

The stability management systems may use a variety of telemetry sensors (e.g., such as a 6-axis Micro-Electro-Mechanical Systems (MEMS), using 3-axis accelerometers and 3-axis gyros) to determine when a RC model vehicle is reacting in such a way as to need an automatic course correction. In some cases, an RC model vehicle's reaction to a road imperfection or anomaly may be too rapid to allow for adequate or precise compensation by a vehicle operator or driver. Therefore, telemetry sensors such as MEMSs and GPS locators may provide a more immediate detection and response to the anomaly or variation in intended direction. A steering stability management system (e.g., an ESS) may automatically adjust the steering and/or potentially the throttle to correct the course of the RC model vehicle to follow the intended steering inputs provided to a hand held remote controller.

The automatic course correction removes an element skill otherwise required in operating an RC model vehicle and may provide an advantage over RC model vehicles without active stability management systems. Accordingly, in cases such as a drag race between two RC model vehicles the course rules may negate the use of stability management systems during the race. The lack of a stability management system will demonstrate a driver/operator's actual skill and ability in operating the RC model vehicle. However, after the RC model vehicle crosses the finish line, a stability management system would be highly desirable to help control the vehicle during braking. In addition, after the finish line, the RC model vehicles are no longer competing against one another and any advantage or disadvantage of a stability management system is no longer a performance factor.

In order to provide stability management during the braking aspects of a competitive RC model vehicle drag race without violating any rules against using stability management systems during the drag race, the current disclosure describes embodiments of RC model vehicles that may able to apply stability management systems only upon braking. And in addition to this, some embodiments may provide verification that the stability management system was only used for braking and not for other aspects of the race.

In cases in which an RC model vehicle may be used for multiple purposes, some embodiments may provide the ability to select between various stability operation modes (e.g., stability management systems on, off, or on braking only). This ability may increase the available circumstances and situations for enjoying the RC model vehicle while still complying with any rules surrounding specific or particular activities, such as drag racing, among others.

Referring generally to FIG. 1, radio controlled or remote controlled (RC) model vehicle system 100 may comprise a controller 110 and an RC (e.g., radio or remote controlled) model vehicle 160. The controller 110 may be wirelessly connected to the RC model vehicle 160 via a wireless link, allowing an operator or driver to operate the RC model vehicle 160 from a remote location. For example, in some situations, an operator or driver will be located in a stationary position with the ability and access to see an entire course or track.

The embodiment of the controller 110 is shown in this case to be a hand held transmitter. While the controller 110 is generically referred to as a transmitter, the controller 110 may further function as a transceiver, both sending and receiving messages from a receiver (described later) provided within or physically coupled with the RC model vehicle 160. There are various types of hand held remote controllers 110 used with RC model vehicles. The hand held remote controller 110 shown as an illustrative example is the type of hand held remote controller 110 generally used for the operation of RC boats, automobiles, and trucks. Referring generally to FIG. 1, this embodiment of a hand held remote controller 160 comprises a rotatable steering input 120 and a finger actuated throttle input 130.

The embodiment of the throttle input 130 may further function as both an accelerator and a brake pedal, such as those found in a full size automobile. Depending upon how the throttle input 130 is actuated, the controller 110 may issue a throttle command, a braking command, or a neutral/coasting command. In some embodiments, the throttle input 130 may even further function to provide a reverse throttle command (i.e., when the RC model vehicle 160 uses electric propulsion motors for example).

Using these two relatively simple inputs, the steering input 120 and the throttle input 130, a driver or operator is able to easily and quickly operate a RC model vehicle 160 using only the controller 110. Forward propulsion, braking, and left and right steering control, enable a driver or operator to generally operate an RC model vehicle 160 in such a way as to duplicate or perform most of the maneuvers of operating a full size vehicle.

In addition to these basic commands, the controller 110 may provide various other controller inputs 140 and controller displays 114 for additional functions and to communicate information. Knobs, switches, buttons and other forms of providing input may allow the controller inputs 140 to actuate various features such as lights, adjust trim levels of the steering input 120 and/or the throttle input 130, or other special features such as trans-braking operations, engine sounds, or modes of operation, among others. The controller displays 114 may include lights, leds, physical location of positions of knobs, switches, etc, or more complex systems such as display screens including graphic and pictorial display capabilities.

In some embodiments, the controller 110 may be coupled with a portable, multi-function, electronic device (MFED) (not shown in this figure), such as a smart phone, tablet, or laptop, among others not specifically identified. The MFED may communicate with the controller 110 via radio-waves or physical electronic link. As an illustrative example, an MFED may be a smart phone or tablet with a graphic display screen and a Bluetooth enabled communication protocol. The graphic display screen in some examples may be quite complex and include simulated gauges such as speedometers and/or tachometers, indications of an RC model vehicle's 160 physical orientation and/or position, information such as operating modes, trim levels, lights on or off, and physical parameters such as battery life, motor temperature, estimated remaining run time, etc.

The controller 110 may wirelessly transmit a steering command, a throttle command, and a braking command to the RC model vehicle 160. The RC model vehicle 160 may comprise a model vehicle body 162, a system platform 200, and other components such as model vehicle indicators 164. In some embodiments, the model vehicle indicators 164 may include lights, sounds, or positions of physical components, some of which may be visible from outside of the model vehicle body 162. While in other embodiments there may further or alternatively be indicators, lights, or speakers not necessarily visible from outside of the model vehicle body 162, but visible when the model vehicle body 162 is removed from the model vehicle 160. Non-visible model vehicle indicators 164 will be discussed in more detail along with the system platform 200.

In some cases, the model vehicle body 162 comprises a thin molded plastic shell used for decorative, aerodynamic, or scale purposes and to provide some degree of protection for the system platform 200 contained at least partially therein. In addition, the model vehicle body 162 may be a single piece releasably secured to the model vehicle chassis 165, or made up of combinations of individual components. While most of the electronics and propulsion devices such as motors, suspensions, propellers, etc., may be provided on, within, or attached to a model vehicle chassis 165 to form the system platform 200, some of these various components and electronics may alternatively be attached to the model vehicle body 162 assembly.

Figure 2:
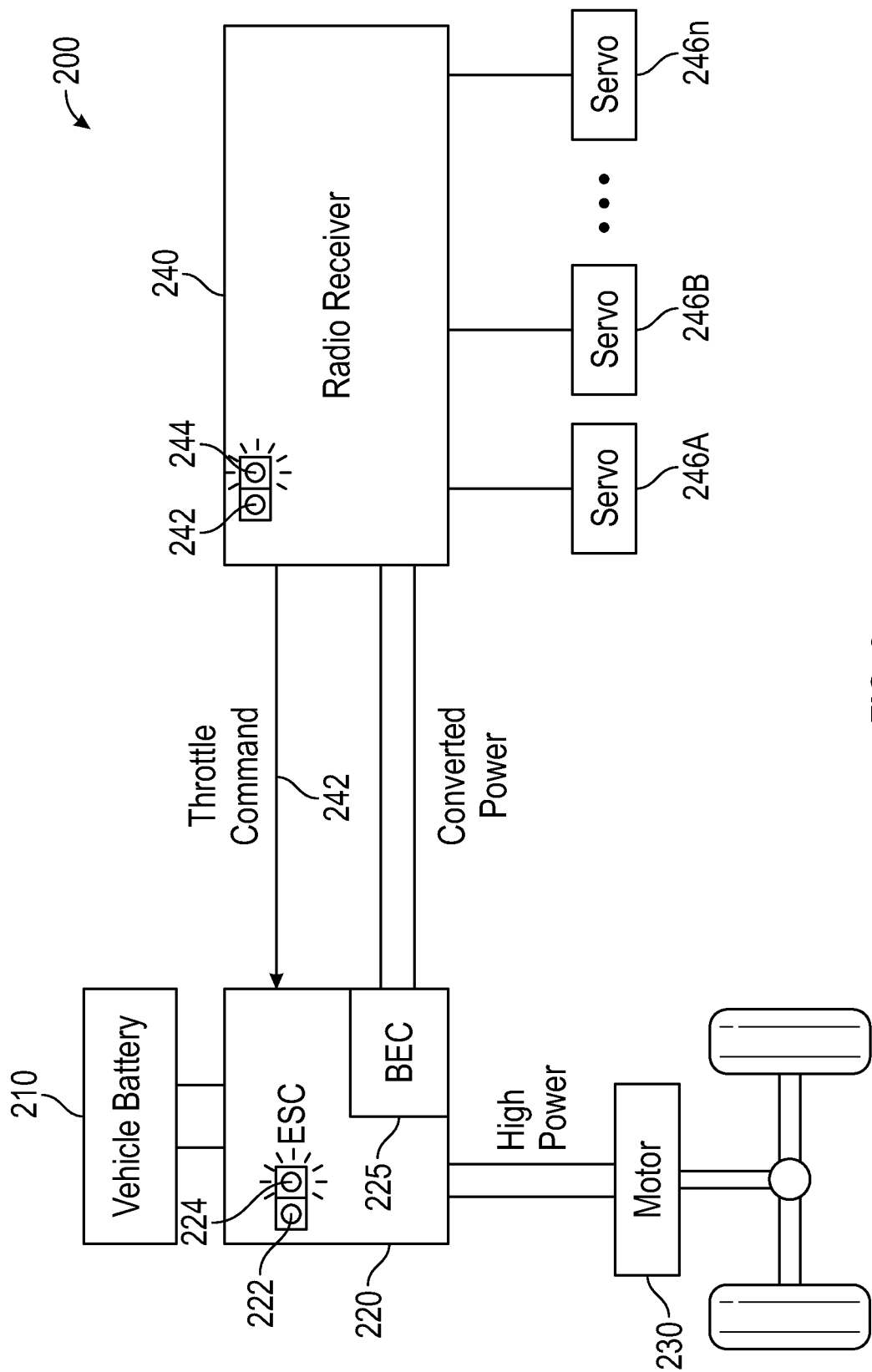
FIG. 2 is a schematic diagram of the system platform of an RC model vehicle, in accordance with an embodiment of the current disclosure.

FIG. 2 shows a general illustrative schematic of the system platform 200. In some embodiments, the system platform 200 may comprise a stored energy device, for example, such as a model vehicle battery 210 (e.g., or a fuel tank), an electronic speed control (ESC) 220, and a model vehicle motor 230. Other components include a radio receiver 240 configured to receive and send wireless signals during communication with the controller 110. The receiver 240 may essentially function as a transceiver, similar to the controller 110. Additionally, the receiver 240 may control one or more individual servos 246A, 246B . . . 246n.

The receiver 240 may receive wireless signals from the controller 110, including steering and throttle commands, among others, and may respond to the controller 110 with data signals such as vehicle metrics, location, and status of various components and/or systems. The receiver 240 interprets these commands and signals and sends data and/or controls the individual servos 246A, 246B . . . 246n and the ESC 220. The ESC 220 for example, may receive an interpreted throttle command from the receiver 240 and provide an appropriate amount of power from a stored energy device, such as a model vehicle battery 210, to a model vehicle motor 230.

As with the use of an automobile as an illustrative example of an RC model vehicle 160, the electric power train and use of batteries and wire connections is also an illustrative example used to simplify the description. Aspects of the current disclosure may directly apply to an RC model vehicle 160 using a combustion engine and fuel tank for propulsion, in which the interpreted throttle commands from the receiver 240 control the actual combustion engine throttle. In such situations, there may be a source of stored energy in addition to a fuel tank such as a battery used to power the receiver and servos 246A, 246B . . . 246n. For electric powered model vehicles 160, there may be 1 or more sources of stored energy such as a vehicle battery 210 along with an auxiliary battery (i.e., for lights, speakers, etc.,) and other sources.

In early generations of RC model vehicles 160 employing electric propulsion via electric motors, there used to be two stored energy devices for every model vehicle 160. One stored energy device was typically used for powering the propulsion system, such as the model vehicle motor 230, and another stored energy device was typically used for providing energy to operate the receiver 240, various servos 246A, 246B . . . 246n, and other electronic accessories. In this illustrative example, the ESC 220 comprises a battery eliminator circuit (BEC) 225 used to transform or convert the relatively high levels of voltage, current, and power from the primary stored energy device, such as the model vehicle battery 210, and provide lower levels of voltage, current, and power to the rest of the electronics in the system platform 200.

Both of these different energy streams can be seen in the illustrated schematic as emanating from the ESC 220. The energy streams are labeled HIGH POWER which is coupled to the motor 230, and CONVERTED POWER coupled to the servos 246A, 246B . . . 246n. The two lines for each set of power flow in this particular case represent the power and ground wire that may be standard for electrical power. However, in embodiments using a three phase electric motor, the two wire attachment to the model vehicle motor 230 would be replaced with three power wires (not shown). Other configurations would use the appropriate connections and distribution components.

In addition, either or both of the ESC 220 or the receiver 240 may include corresponding ESC inputs 222 or receiver inputs 242 and/or ESC indicators 224 or receiver indicators 244. These various inputs and/or indicators may be used for manually inputting or setting the ESC 220 or the receiver 240 into various modes of operation. Alternatively or in addition to, the various inputs and/or indications may enable or disable features of the ESC 220, receiver 240, or RC model vehicle 160 (such as accessories, lights, etc.). While the ESC 220 and receiver 240 may have these manual inputs (222, 242) or indicators (224, 244), they may alternatively be provided or located on the controller 110, or virtually via software on an MFED.

Stability Management Systems

Stability management systems such as the Electronic Steering Stability (ESS) are described in the co-owned, U.S. Pat. No. 10,073,448 B2, issued Sep. 11, 2018, to Thomas Michael KAWAMURA, et. al, the contents of which are herein incorporated by reference in their entirety. Stability management systems may refer to a system controlling the ability of the RC model vehicle 160 to automatically correct for road course imperfections or drifting from a direction indicated by a received steering command.

In an event using a road or off-road race course, an RC model vehicle 160 operator or driver can only detect the RC model vehicle's 160 motion visually from a remote location. Unlike driving a full sized vehicle, the operator or driver cannot feel when the RC model vehicle 160 encounters a disturbance, such as hitting a raised area of earth or a pothole, among others. In addition, the time constraints for a scaled vehicle at speed are much smaller than the time constraints for a similar situation in a full sized vehicle. There is less time for an operator to react to ensure a stable trajectory or an intended direction.

Stability management systems may aid the operator or driver by stabilizing the steering or correcting to the intended direction of the RC model vehicle 160 indicated by the original steering command. The original steering command corresponds to the driver's or operator's steering input 120 via the controller 110. The stability management system may make small automatic adjustments to the original steering command received by the receiver 240 in order to correct the physical trajectory of the model vehicle 160.

The receiver 240 may output an adjusted or amended steering command instruction to one of the servos 246A, 246B . . . 246n to correct the direction of the RC model vehicle 160 impacted by a course disturbance or condition, such as the model vehicle 160 sliding on a wet course. Accordingly the operator or driver can focus on larger overall steering inputs while the stability management system responds to disturbances altering or impacting the operator's or driver's intended steering direction.

However, stability management systems are like many driver's aids, there are times in which a driver or operator wishes to test the levels of their performance or reflexes without any computer or automatic interference. In these cases, a driver or operator may wish to have the ability to turn the stability management system on or off, or to select when the system operates. Some situations may require that an operator or driver control a model vehicle 160 without any electronic aids, such as when governing body rules determine when and where a stability management system can be used.

Therefore, embodiments of the stability management systems may comprise alternative stability operating modes. For example, some stability operating modes may include 'stability management on', in which the system is always on; 'stability management off', in which the system is always off; or 'stability management on braking', in which the system is only on while the braking command is received by the receiver 240. Of course, other types and combinations of stability operating modes may be implemented in other types of situations and not limited to these three illustrative examples.

In a competitive situation like drag racing, the 'stability management on braking' mode would allow the competitors to compete solely on the basis of their own skill during the competitive portion of the race and then allow automated assistance to help control the RC model vehicle 160 after it crosses the finish line and begins to slow down. 'Stability management on' would allow the RC model vehicle 160 to function more in coordination with the intended steering inputs 120 provided by the driver or operator. In other words, the model vehicle 160 would more closely react as the driver or operator intended, regardless of course disturbances or conditions. Further, 'stability management off' would prevent any correction regardless of the throttle input or the steering input, or the physical behavior of the RC model vehicle 160. The model vehicle 160 would react to course disturbances or conditions and any correction would only be based upon the driver's or operator's level of personal skill.

In some embodiments, stability management modes may be selected via ESC inputs 222 or receiver inputs 242 functioning as a stability mode input device. Both of these inputs are provided in the RC model vehicle 160 and could only be changed when an operator or driver is physically in contact with the model vehicle 160, and not dynamically during a race for example. In other words, using the ESC inputs 222 or receiver inputs 242 allows the stability management mode to be set for the duration of the entire race. The stability management mode may be indicated virtually such as with an MFED or by the ESC indicator 224 and/or the receiver indicator 244. The actual ESC input 222 or receiver input 242 may be a dedicated switch, knob, or other mechanical, electromechanical, or virtual switch, among others not specifically identified.

In some other embodiments, it may be advantageous or permitted to allow for dynamic implementation of a stability management mode. In these types of circumstances, the controller 110 may be provided with a dedicated switch, knob, or other mechanical, electromechanical, or a virtual switch provided via a MFED may be used to select a stability operating mode selection. In these embodiments, a driver or operator may notice a model vehicle reacting to course disturbances or conditions and decide to switch on a stability management system. Some governing bodies may not allow for dynamic selection of a stability management mode and may require indicators to inform inspectors or course marshals monitoring a competition.

Once the stability operating mode has been selected and input via the stability mode input device, the selected stability operating mode may be indicated by either an ESC indicator 224 or a receiver indicator 244. These two indicators may function as stability status indicators. As with the stability mode input device, the stability status indicator may be a separate component dedicated to indicating the selected stability operating mode. The stability status indicator may be any form of sensory indicator, in other words, a device that communicates to the driver, operator or race official via the driver, operator, or race official's senses.

Sensory indicators may be visual, audio, or physical (i.e., vibratory or touch indicators). Visual sensory indicators may be via illumination such as a blinking incandescent light or a light emitting diode (LED), or via a graphical display on a display screen, or a physical position of a knob or switch, for example among others. Audio sensory indicators may be sound such as a beeping speaker, or recorded message, for example among others. A physical sensory indicator may be a vibration, for example among others. In some embodiments, various combinations of each type of sensory indicators may function to communicate the current stability operating mode.

The stability mode input devices may be located in the RC model vehicle 160 such as with the ESC input 222 or the receiver input 242 in order to prevent inadvertent or intentional altering of the stability operating mode after the RC model vehicle 160 has been placed on a starting line. A pre-race and/or a post-race inspection by a race official could then confirm what stability operating mode was being used during a competition or race. In other words, a driver or operator would have to physically access the RC model vehicle 160 in order to set the stability operating mode. A driver or operator could not remotely set the stability operating mode.

While in other embodiments of this disclosure, a stability management mode may be selected remotely, for example, such as via a controller input 140 functioning as a stability mode input device. However, in embodiments in which the stability mode may be selected remotely, there may be physical indicators on the RC model vehicle 160, the controller 110, or elsewhere to indicate the current stability operating mode during the actual race. For example, as a race progresses, a visual stability status indicator may illuminate an incandescent light or LED provided on the model vehicle 160 and visible from multiple perspectives in order to confirm and maintain compliance with the rules.

In still other embodiments, the stability operating mode may be selected and displayed via any number of various methods and a historical record may be created for at least the duration of the race. For example, a historical recording device or system may indicate the stability management mode for a particular time, location, or duration. Some embodiments may make use of an MFED running an app for example, to record the stability operating mode selected during a competitive race.

Race officials could rapidly check the stability management mode in a pre- and post-race inspection and further verify the use of a proper stability management mode via an approved recording device or technique. Since many modern RC model vehicles 160 include Global Positioning System (GPS) tracking and various sensors monitoring speed, acceleration, and time, both an operator and a race official can determine that the proper stability management mode was used for the entire duration of a race. In addition, a model vehicle 160 operator or driver may be able to use the historical information to evaluate both the operator's or driver's and the RC model vehicle's 160 performance throughout the race.

Of course, there are other ways to ensure compliance with governing body rules and requirements without using a dedicated sensory indicator. In still another embodiment, an RC model vehicle 160 may be inspected by having the RC model vehicle 160 initially switched on and in communication with the transmitter 110. The RC model vehicle may then be picked up and physically rotated slightly clockwise and counter clockwise. If a stability management system is turned on and operating, the steering (as observed via the front wheels of the RC model vehicle 160) will automatically slightly turn the front wheels in an attempt to correct for the physical rotation. If the stability management system is turned off, the steering will not attempt any correction and the RC model vehicle 160 should not react in any way.

To increase the robustness of the inspection, the race rules and requirements may further require that the propulsion system be operating during this type of physical test (e.g., the rear and/or front wheels or a propeller being driven by the model vehicle motor). While in still other embodiments, the race rules and requirements may add that an RC model vehicle's 160 GPS system show that the model vehicle 160 is moving or changing location during this check. Finally, there may be embodiments that require the RC model vehicle 160 to be traveling above a particular speed (e.g., as determined by GPS) and/or distance and record any activation of the stability management system during the test in order to show compliance with the rules and requirements.

A further embodiment may include a method for configuring a stability management system of a radio controlled model vehicle. The method may include powering on the radio controlled model vehicle 160 and a controller 110. A driver or operator may select a stability operating mode using a stability input device and verify the stability operating mode using a stability status indicator. The stability operating mode 'stability management on braking' may be selected if the method is used for drag racing. The 'stability management on braking' may cause the stability management system to function only while the receiver 240 receives a braking command from the controller 110.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements.

Although only a few example embodiments have been described in detail above, those skilled in the art will readily appreciate that a wide range of variations, modifications, changes, and substitutions are contemplated in the foregoing disclosure and, in some instances, some features of the present disclosure may be employed without a corresponding use of the other features.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

It is the express intention of the applicant not to invoke 35 U.S.C. § 112, paragraph 6 for any limitations of any of the claims herein, except for those in which the claim expressly uses the words 'means for' together with an associated function.

I claim:

1. A radio controlled model vehicle comprising:
a receiver located in the radio controlled model vehicle and comprising;
a steering stability management system to automatically adjust at least one of steering or throttle to correct a course of the radio controlled model vehicle to follow an intended steering input comprising:
a stability operating mode;
a 6-axis Micro-Electrical-Mechanical System (MEMS) to adjust the at least one of—steering or throttle of the radio controlled model vehicle, further comprising:
3-axis accelerometers and 3-axis gyroscopes;
a stability status indicator that shows the stability operating mode;
wherein the stability operating mode is altered by a stability mode input device;
wherein the stability operating mode is a stability management on braking; and
wherein the steering stability management system functions only while the receiver receives a braking command.

2. The radio controlled model vehicle according to claim 1 wherein the stability status indicator is a sensory indicator.

3. The radio controlled model vehicle according to claim 1 wherein the stability mode input device is a multi-function electronic device.

4. The radio controlled model vehicle according to claim 1 wherein the stability mode input device is a stability controller provided on the receiver.

5. The radio controlled model vehicle according to claim 1 wherein the stability mode input device is a stability controller provided on a controller.

6. The radio controlled model vehicle according to claim 2 wherein the sensory indicator is a visible indicator or an auditory indicator.

7. The radio controlled model vehicle according to claim 2 wherein the sensory indicator is a visible indicator comprising a light emitting diode.

8. The radio controlled model vehicle according to claim 1 wherein the stability status indicator comprises a stability record file comprising the stability operating mode and a time stamp or model vehicle location.

9. The radio controlled model vehicle according to claim 1 wherein the stability operating modes further comprise stability management on, or stability management off.

10. A radio controlled model vehicle comprising:
a steering stability management system to automatically adjust at least one of steering or throttle to correct a course of the radio controlled model vehicle to follow an intended steering input comprising;
a stability operating mode;
a 6-axis Micro-Electrical-Mechanical System (MEMS) to adjust the at least one of steering or throttle of the radio controlled model vehicle, further comprising: 3-axis accelerometers and 3-axis gyroscopes;
a stability status indicator that shows the stability operating mode;
wherein a stability input device alters the stability operating mode;
wherein the stability operating mode is a stability management on braking; and
wherein the steering stability management system functions only while a receiver receives a braking command.

11. The radio controlled model vehicle according to claim 10 wherein the stability status indicator is a sensory indicator.

12. The radio controlled model vehicle according to claim 10 wherein the stability mode input device is a multi-function electronic device.

13. The radio controlled model vehicle according to claim 10 wherein the stability mode input device is a stability controller provided on the receiver.

14. The radio controlled model vehicle according to claim 10 wherein the stability mode input device is a stability controller provided on a controller.

15. A method for configuring a steering stability management system to automatically adjust at least one of steering or throttle to correct a course of a radio controlled model vehicle to follow an intended steering input comprising:
powering on the radio controlled model vehicle and a controller;
selecting a stability management on braking for a stability operating mode using a stability input device;
verifying the stability operating mode using a stability status indicator;
wherein the steering stability management system, comprising a 6-axis Micro-Electrical-Mechanical System (MEMS) to adjust the at least one of steering or throttle of the radio controlled model vehicle, functions only while a receiver receives a braking command from the controller.

16. The method according to claim 15, wherein the stability status indicator comprises an illuminating device to show the stability operating mode.

17. The method according to claim 15, wherein the stability operating modes further comprise stability management on or stability management off.

18. The method according to claim 15, wherein the stability input device comprises a multi-function electronic device.

19. The method according to claim 15, wherein the stability input device comprises a stability controller provided on the receiver.

20. The method according to claim 15, wherein the stability status indicator further comprises a stability record file comprising the stability operating mode and a time stamp or model vehicle location.

\* \* \* \* \*